United States Patent
Kuchar et al.

(10) Patent No.: US 10,853,812 B2
(45) Date of Patent: Dec. 1, 2020

(54) BLOCKCHAIN TRANSACTION SAFETY

(71) Applicant: Coral Protocol, Grand Cayman (KY)

(72) Inventors: David Charles Kuchar, San Francisco, CA (US); Malcolm Garland, San Francisco, CA (US)

(73) Assignee: Coral Protocol, Grand Cayman (KY)

( * ) Notice: Subject to any disclaimer, the term of this patent is extended or adjusted under 35 U.S.C. 154(b) by 0 days.

(21) Appl. No.: 16/295,153

(22) Filed: Mar. 7, 2019

(65) Prior Publication Data

US 2019/0279215 A1 Sep. 12, 2019

Related U.S. Application Data

(60) Provisional application No. 62/639,955, filed on Mar. 7, 2018.

(51) Int. Cl.
*G06Q 40/00* (2012.01)
*G06Q 20/40* (2012.01)
(Continued)

(52) U.S. Cl.
CPC ..... *G06Q 20/4016* (2013.01); *G06F 16/9024* (2019.01); *G06Q 20/065* (2013.01);
(Continued)

(58) Field of Classification Search
CPC .................................................... G06Q 40/00
See application file for complete search history.

(56) References Cited

U.S. PATENT DOCUMENTS 9,818,116 B2 11/2017 Caldera
9,852,427 B2 12/2017 Caldera
(Continued)

FOREIGN PATENT DOCUMENTS

WO 2015085393 A1 6/2015

OTHER PUBLICATIONS

Mauro Conti, Sandeep Kumar, Chhagan Lal, and Sushmita Ruj, A Survey on Security and Privacy Issues of Bitcoin, Dec. 25, 2017, IEEE, web, p. 1-10 (Year: 2017).*
(Continued)

*Primary Examiner* — I Jung Liu
(74) *Attorney, Agent, or Firm* — RMCK Law Group PLC

(57) ABSTRACT

A method includes acquiring blockchain data that includes transactions between a plurality of blockchain addresses. The method includes labeling a set of the blockchain addresses as fraudulent and generating a graph data structure based on the blockchain data. The method includes calculating a set of scoring features for each blockchain address, where each set of scoring features includes a graph-based scoring feature. Calculating the graph-based scoring feature includes calculating a number of transactions associated with the blockchain address in the graph data structure. The method includes generating a scoring model using sets of scoring features for the blockchain addresses that are labeled as fraudulent and generating a trust score for each blockchain address using the scoring features and the scoring model. The trust score indicates a likelihood that the blockchain address is involved in fraudulent activity. Additionally, the method includes sending a requested trust score to a requesting device.

30 Claims, 13 Drawing Sheets

(51) Int. Cl.
*H04L 9/06* (2006.01)
*G06Q 20/06* (2012.01)
*G06F 16/901* (2019.01)

(52) U.S. Cl.
CPC ......... *G06Q 20/0655* (2013.01); *G06Q 40/00* (2013.01); *H04L 9/0618* (2013.01); *H04L 2209/38* (2013.01); *H04L 2209/56* (2013.01)

(56) References Cited

U.S. PATENT DOCUMENTS

| | | | |
|---|---|---|---|
| 2006/0212931 | A1 | 9/2006 | Shull et al. |
| 2014/0046818 | A1* | 2/2014 | Chung ............... G06Q 30/0207 705/35 |
| 2015/0287026 | A1* | 10/2015 | Yang ...................... G06Q 20/06 705/69 |
| 2015/0363772 | A1 | 12/2015 | Ronca et al. |
| 2015/0363777 | A1 | 12/2015 | Ronca et al. |
| 2015/0363783 | A1 | 12/2015 | Ronca et al. |
| 2016/0071108 | A1 | 3/2016 | Caldera et al. |

OTHER PUBLICATIONS

PCT International Search Report and Written Opinion dated May 10, 2019 for International Application No. PCT/US2019/021087, 12 pages.
Buechler, M. et al., "Decentralized Reputation System for Transactions Networks," 2015, https://pdfs.semanticscholar.org/567c/d3ba14fc170d798e34ae13f167ac8d1f2c02.pdf, accessed on Jun. 6, 2019, 9 pages.
Greenfield, R., "Reputation on the Blockchain," Nov. 20, 2017, https://medium.com/@robertgreenfieldiv/reputation-on-the-blockchain-624947b36897, accessed on Jun. 6, 2019, 5 pages.
King, S. et al., "PPCoin: Peer-to-Peer Crypto-Currency with Proof-of-Stake," Aug. 19, 2012, https://whitepaperdatabase.com/peercoin-ppc-whitepaper/, accessed on Jun. 6, 2019, 6 pages.
Konstantopoulos, G., "Understanding Blockchain Fundamentals, Part 1: Byzantine Fault Tolerance," Nov. 30, 2017, https://medium.com/loom-network/understanding-blockchain-fundamentals-part-1-byzantine-fault-tolerance-245f46fe8419, accessed on Jun. 6, 2019, 8 pages.
Nakamoto, S., "Bitcoin: A Peer-to-Peer Electronic Cash System," published 2018, https://bitcoin.org/bitcoin.pdf, accessed on Jun. 6, 2019, 9 pages.
Rouse, M., "Consensus algorithm," What is consensus algorithm?—Definition from WhatIs.com, Dec. 6, 2017, https://web.archive.org/web/20171206231545/http://whatis.techtarget.com/definition/consensus-algorithm, accessed on Jun. 6, 2019, 1 page.
Tar, A., "Proof-of Work, Explained," Jan. 17, 2018, https://cointelegraph.com/explained/proof-of-work-explained, accessed on Jun. 6, 2019, 7 pages.
Wikipedia—Proof-of-stake, https://web.archive.org/web/20180206112920/https://en.wikipedia.org/wiki/Proof-of-stake, Feb. 6, 2018, accessed on Jun. 6, 2019, 4 pages.
Witherspoon, Z., "A Hitchhiker's Guide to Consensus Algorithms," Feb. 12, 2018, https://hackernoon.com/a-hitchhikers-guide-to-consensus-algorithms-d81aae3eb0e3, accessed on Jun. 6, 2019, 9 pages.
PCT International Search Report and Written Opinion dated Jul. 31, 2019 for International Application No. PCT/US2019/035198, 11 pages.
U.S. Appl. No. 16/429,562, filed Jun. 3, 2019, Bravick et al.

\* cited by examiner

BLOCKCHAIN TRANSACTION SAFETY

CROSS-REFERENCE TO RELATED APPLICATIONS

This application claims the benefit of U.S. Provisional Application No. 62/639,955, filed on Mar. 7, 2018. The disclosure of the above application is incorporated herein by reference in its entirety.

FIELD

The present disclosure relates to providing safeguards against fraud in blockchain transactions.

BACKGROUND

Cryptocurrencies (e.g., Bitcoin) may provide a medium of exchange for pseudonymous/anonymous cryptocurrency transactors. Cryptocurrencies may operate on a decentralized network of computing devices that each operate according to a blockchain protocol. The decentralized network may control a blockchain transaction ledger that includes a list of transactions between different blockchain addresses. The transactions on the decentralized network may be verified through cryptography. Transactors may interact with the decentralized network using wallet applications. In some cases, the transactors may interact with the decentralized network via a digital currency exchange.

SUMMARY

In one example, the present disclosure is directed to a method comprising acquiring, at a server, blockchain data from a blockchain network. The blockchain data includes a plurality of transactions between a plurality of blockchain addresses. The method further comprises labeling a set of the blockchain addresses as fraudulent and generating a graph data structure based on the blockchain data. The graph data structure includes nodes for the blockchain addresses and includes edges between the nodes for blockchain transactions. The method further comprises calculating a set of scoring features for each blockchain address. Each set of scoring features includes a graph-based scoring feature. Calculating the graph-based scoring feature includes calculating a number of transactions associated with the blockchain address in the graph data structure. The method further comprises generating a scoring model using sets of scoring features for the blockchain addresses that are labeled as fraudulent and generating a trust score for each of the blockchain addresses using the scoring features associated with the blockchain addresses and the scoring model. The trust score indicates a likelihood that the blockchain address is involved in fraudulent activity. The method further comprises receiving a trust request for a specified blockchain address from a requesting device and sending the trust score for the specified blockchain address to the requesting device.

In one example, the present disclosure is directed to a system comprising one or more processing units that execute computer-readable instructions that cause the one or more processing units to acquire blockchain data from a blockchain network. The blockchain data includes a plurality of transactions between a plurality of blockchain addresses. The one or more processing units are configured to label a set of the blockchain addresses as fraudulent and generate a graph data structure based on the blockchain data. The graph data structure includes nodes for the blockchain addresses and includes edges between the nodes for blockchain transactions. The one or more processing units are configured to calculate a set of scoring features for each blockchain address. Each set of scoring features includes a graph-based scoring feature. Calculating the graph-based scoring feature includes calculating a number of transactions associated with the blockchain address in the graph data structure. The one or more processing units are configured to generate a scoring model using sets of scoring features for the blockchain addresses that are labeled as fraudulent and generate a trust score for each of the blockchain addresses using the scoring features associated with the blockchain addresses and the scoring model. The trust score indicates a likelihood that the blockchain address is involved in fraudulent activity. The one or more processing units are configured to receive a trust request for a specified blockchain address from a requesting device and send the trust score for the specified blockchain address to the requesting device.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Although cryptocurrencies have experienced growth, the mainstream utility of cryptocurrencies as a medium of exchange may be more limited due to lack of payer protections. For example, cryptocurrency funds sent to a fraudulent party may not be readily recovered. The trust system 100 of the present disclosure generates trust scores for cryptocurrency transactors. The trust scores can offer cryptocurrency transactors a safeguard against fraud while preserving user anonymity and autonomy. The trust scores may provide a baseline level of trust upon which other security layers can be built, including cryptocurrency payment insurance, protection, and restitution (e.g., see FIG. 11).

A trust system 100 (e.g., a server) generates trust scores for cryptocurrency transactors. For example, for a cryptocurrency based on blockchain technology, the trust system 100 can generate trust scores for different blockchain addresses that interact on the blockchain. The trust system 100 may determine the trust scores based on data retrieved from various data sources along with blockchain data upon which the cryptocurrency is based. A trust score may be a number (e.g., a decimal or integer) that indicates a likelihood that the blockchain address is involved in fraudulent activity. Put another way, a trust score can represent the propensity of a blockchain address to be involved with fraudulent activity.

A cryptocurrency transactor can request trust scores from the trust system 100 before engaging in a blockchain transaction in which funds (e.g., blockchain tokens) are transacted on the blockchain. In general, a transactor can use a trust score to determine whether the blockchain address with which they are transacting is trustworthy. For example, a transactor that intends to send funds to a receiving party may request a trust score for the receiving party. In this example, the transactor can use the trust score for the intended receiver in order to evaluate the likelihood that the intended receiver is a fraudulent party.

Transactors can use trust scores to take a variety of actions. For example, transactors may use trust scores to determine whether to proceed with or cancel a blockchain transaction. As another example, transactors (e.g., digital exchanges) can use trust scores to determine whether to insure a transaction (e.g., see FIG. 11). As another example, organizations can use trust scores to decide whether to accept funds from a blockchain address. As such, the trust scores described herein can help protect transactors from falling victim to fraud or from receiving fraudulent funds. Note that the trust scores inform the transactors of the degree to which any cryptocurrency address may be trusted without requiring the transactor to know the identity of the party behind the address. As such, the trust scores may preserve a transactor anonymity.

Figure 1A:
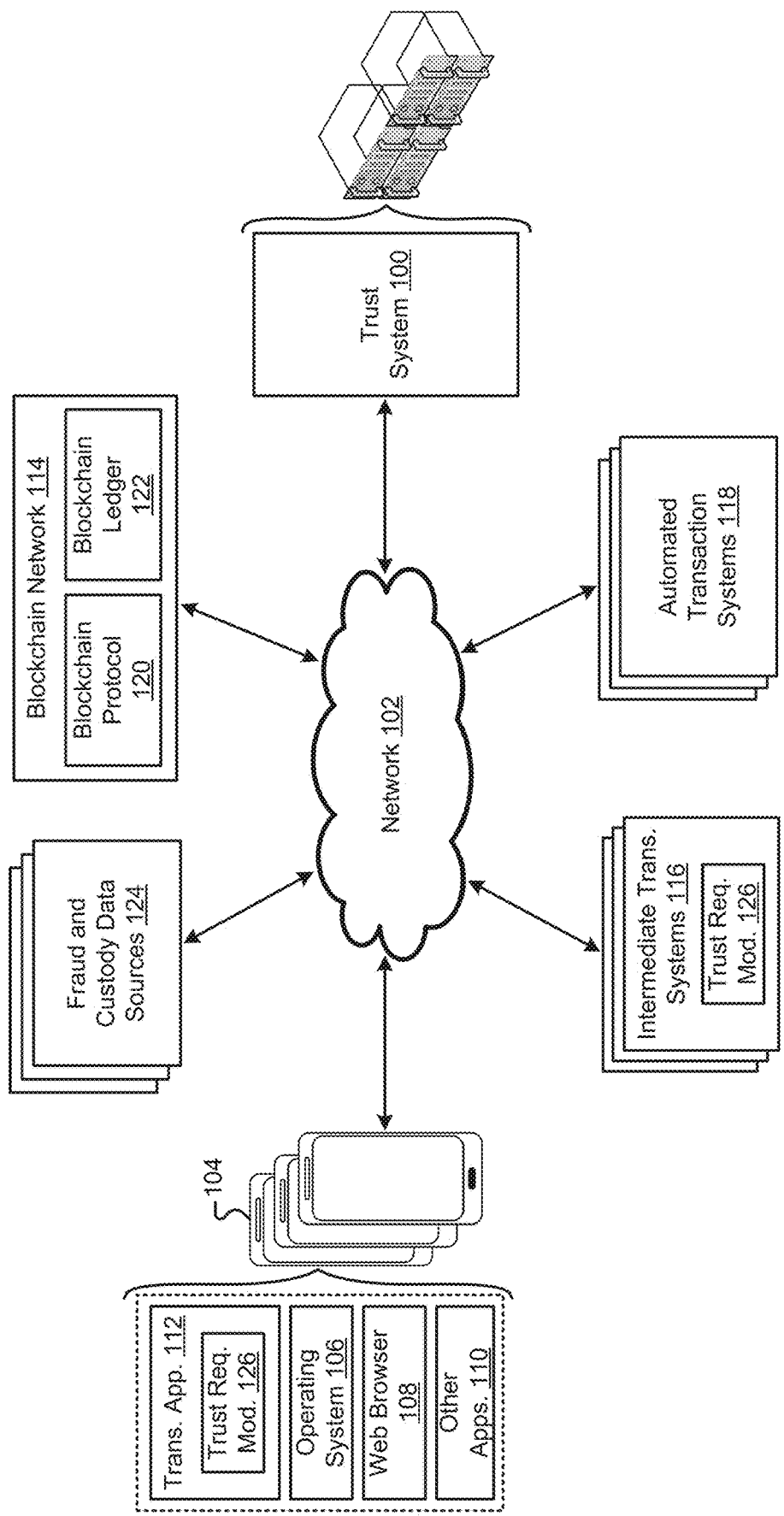
FIGS. 1A-1D illustrate an example trust system in communication with cryptocurrency transactor computing devices, intermediate transaction systems, and automated transaction systems.

FIG. 1A illustrates an example trust system 100 in communication with cryptocurrency transactor computing devices 104, 116, 118 (hereinafter "transactor computing devices") via a network 102. The network 102 may include various types of computer networks, such as a local area network (LAN), wide area network (WAN), and/or the Internet. The trust system 100 may include one or more computing devices (e.g., one or more server computing devices). The transactor computing devices include computing devices that can interact with the trust system 100. Example transactor computing devices may include user transactor devices 104, such as smartphones, tablets, laptop computers, desktop computers, or other computing devices. A user transactor device 104 may include an operating system 106 and a plurality of applications, such as a web browser application 108 and additional applications 110.

The user transactor device 104 can include a transaction application 112 that can transact with the blockchain network 114 to perform blockchain transactions. The transaction application 112 can also request trust scores from the trust system 100. Example transaction applications may be referred to as "wallet applications." For example, the transaction application 112 may be referred to as a "decentralized wallet," as there may be no centralized server-side components.

Additional example transactor devices may be included in intermediate transaction systems 116. An intermediate transaction system 116 (e.g., one or more server computing devices) may communicate with the blockchain network 114, user transactor devices 104, and the trust system 100.

An intermediate transaction system 116 can perform cryptocurrency transactions on behalf of the user transactor devices 104. The intermediate transaction system 116 can also acquire trust scores from the trust system 100 on behalf of the user transactor devices 104. In some implementations, the intermediate transaction system 116 can provide a user interface for the user transactor devices 104 (e.g., via a web-based interface and/or an installed transaction application). An example intermediate transaction system may include a digital currency exchange (e.g., Coinbase, Inc.). In some implementations, exchanges may be decentralized.

Additional example transactor devices may be included in automated transaction systems 118. An automated transaction system 118 (e.g., one or more server computing devices) may communicate with the trust system 100 and the blockchain network 114. Example automated transaction systems 118 may include payment systems, such as a payment system or gateway that makes recurring payments (e.g., Stripe, Inc. or Plaid Inc.), The transactor devices 104, 116, 118 can engage in transactions on the blockchain network 114. A blockchain network 114 may be formed by a network of computing devices that each operate according to a blockchain protocol 120. The blockchain network 114 may control a blockchain transaction ledger 122 (hereinafter "blockchain ledger 122"). The blockchain ledger 122 includes a list of transactions between different blockchain addresses. The blockchain ledger 122 may also include additional data, such as transaction metadata. Example blockchain networks may include, but are not limited to, Bitcoin, Ethereum, etc. Although a single blockchain network 114 is illustrated in FIG. 1A, the trust system 100 can provide trust scores for addresses on multiple different blockchain networks using the techniques described herein.

A blockchain ledger 122 may include blockchain addresses that identify transactors on the blockchain network 114. A transactor may refer to a party that controls transactions for a blockchain address. For example, a transactor may include an individual or an organization, such as a business, a non-governmental organization, or a decentralized autonomous organization. A transactor can control one or more blockchain addresses on a single blockchain network. A transactor can also have one or more blockchain addresses on different blockchain networks.

A transactor can initiate a blockchain transaction in which the transactor's blockchain address sends/receives funds to/from another blockchain address. A blockchain address that sends funds to another blockchain address may be referred to herein as a "blockchain sender address" or a "sender address." The blockchain address that receives funds may be referred to herein as a "blockchain receiver address" or a "receiver address."

Figure 1B:
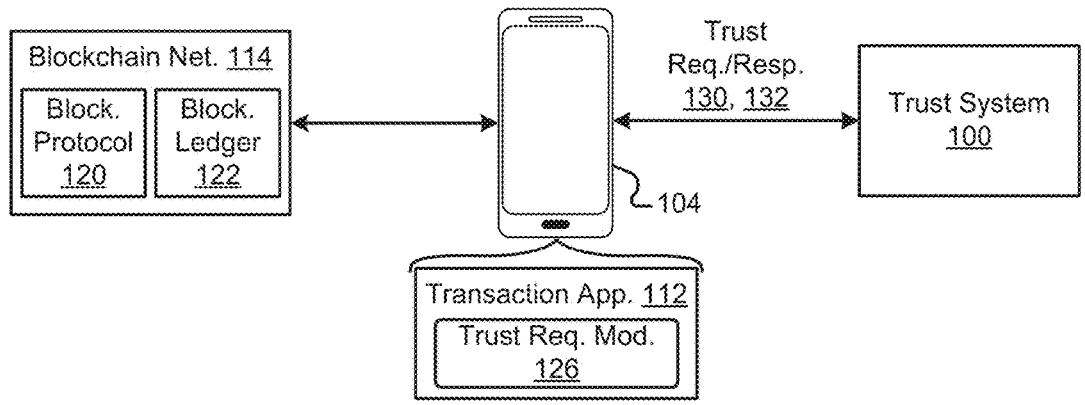
Figure 1C:
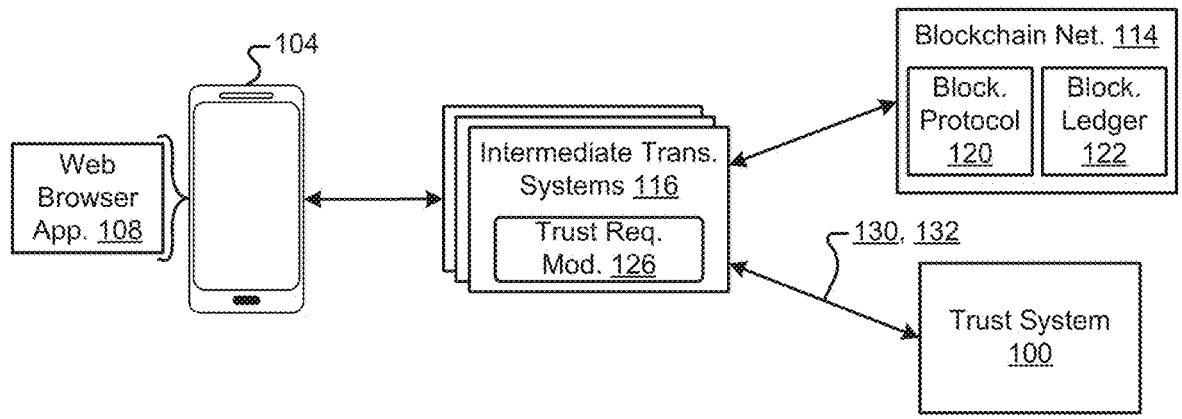
Figure 1D:
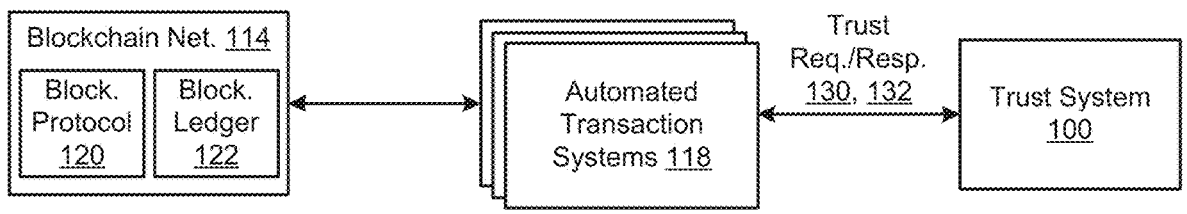

The transactor devices 104, 116, 118 can send trust requests 130 to the trust system 100 and receive trust responses 132 from the trust system 100 (e.g., see FIGS. 1B-1D). The trust request 130 may indicate one or more blockchain addresses for which the transactor would like a trust report (e.g., one or more trust scores). In some implementations, the trust request 130 can include a request payment, such as a blockchain token and/or fiat currency (e.g., United States Dollars). The request payment may be collected by the owner/operator of the trust system 100 as payment for providing the trust score(s).

In one example, a transactor device 104, 116, 118 can send a trust request 130 to the trust system 100 and receive a trust response 132 (e.g., trust report) from the trust system 100. The transactor device 104, 116, 118 and trust system 100 may communicate via an application programming interface (API). The trust request 130 may include a blockchain address for the transactor on the other side of the transaction. For example, a trust request from a sender may request a trust report for the receiver's blockchain address. The sender may make a decision based on the received trust report, such as whether to engage in the blockchain transaction with the receiver.

FIGS. 1B-1D illustrate interactions between different transactor devices/systems 104, 116, 118, the blockchain network 114, and the trust system 100. In FIG. 1B, the user transactor device 104 includes a transaction application 112 (e.g., a wallet application) that transacts with the blockchain network 114. The transaction application 112 includes a trust request module 126 that interfaces with the trust system 100. For example, the trust request module 126 can generate the trust request 130 (e.g., a web request). The trust request module 126 can also receive the trust response 132 from the trust system 100. In some implementations, the trust request module 126 can generate a graphical user interface (GUI) that the user may interact with in order to send the trust request 130 and view the trust report (e.g., see FIGS. 10A-10B).

In FIG. 1C, a transactor device 104 can transact on the blockchain network 114 via an intermediate transaction system 116. For example, in FIG. 1C, the transactor device 104 can include a web browser application 108 that interacts with the intermediate transaction system 116. The intermediate transaction system 116 (e.g., a web server) can provide an interface to the web browser 108 for transacting on the blockchain network 114. The intermediate transaction system 116 may also provide an interface (e.g., a web-based interface) for the user to select whether the user wants a trust report before engaging in the blockchain transaction.

In FIG. 1D, an automated transaction system 118 controls transactions on the blockchain network 114. The automated transaction system 118 can also request trust reports from the trust system 100. In some implementations, the transactions engaged in by the automated transaction system may depend on the trust scores reported by the trust system. For example, the automated transaction system can engage in transactions if the trust score indicates that the address is not fraudulent.

Although devices/systems 104, 116, 118 may make a trust request 130 in order to receive trust scores before making a blockchain transaction, in some implementations, other devices/systems may request trust scores in other scenarios. For example, compliance officers at an exchange may request trust scores for compliance reasons.

Referring back to FIG. 1A, the environment includes data sources 124 that the trust system 100 may use to determine whether blockchain addresses are fraudulent. Example data sources 124 described herein include fraud data sources and custody data sources.

Figure 2:
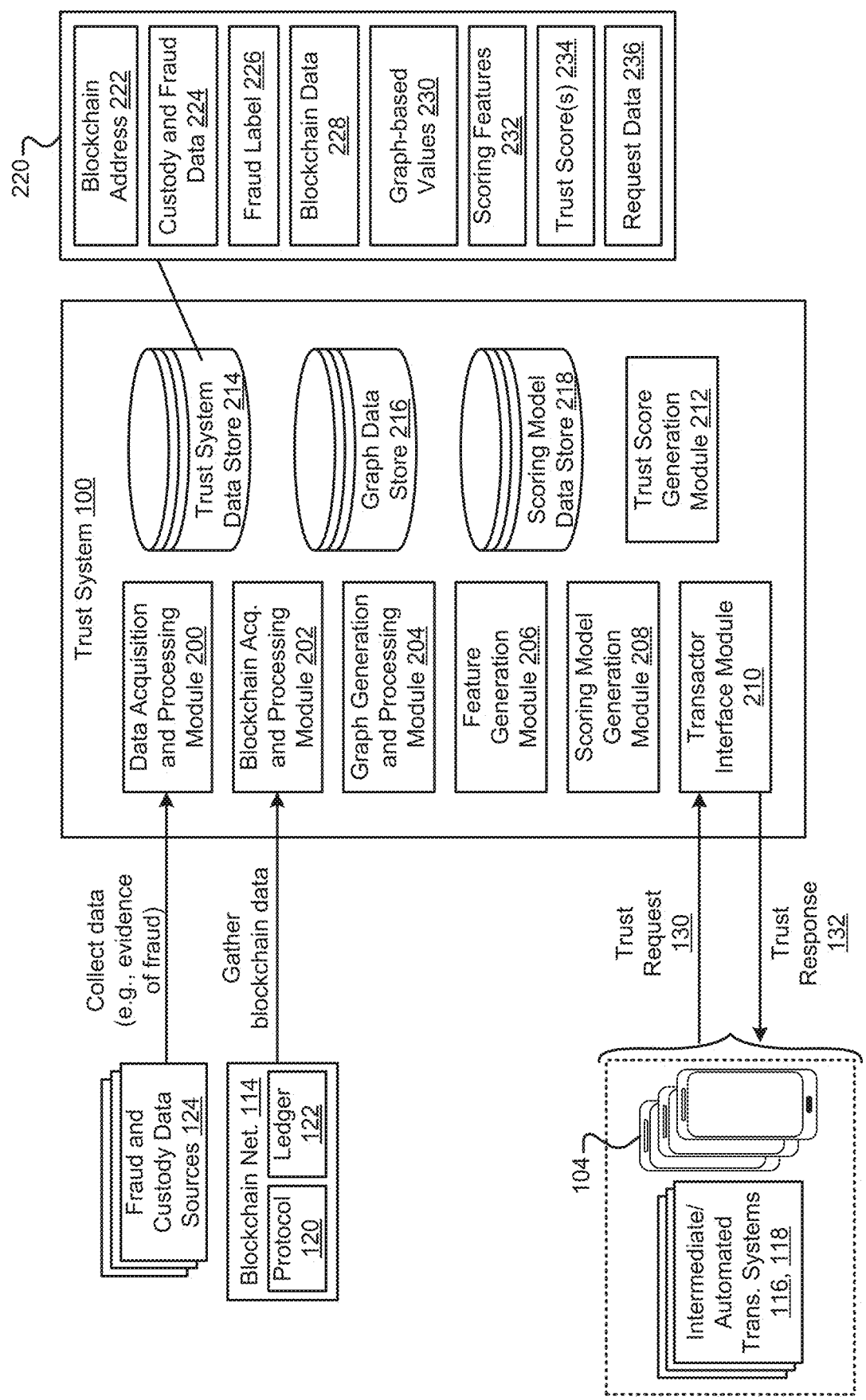
FIG. 2 is a functional block diagram of a detailed example trust system.
Figure 3:
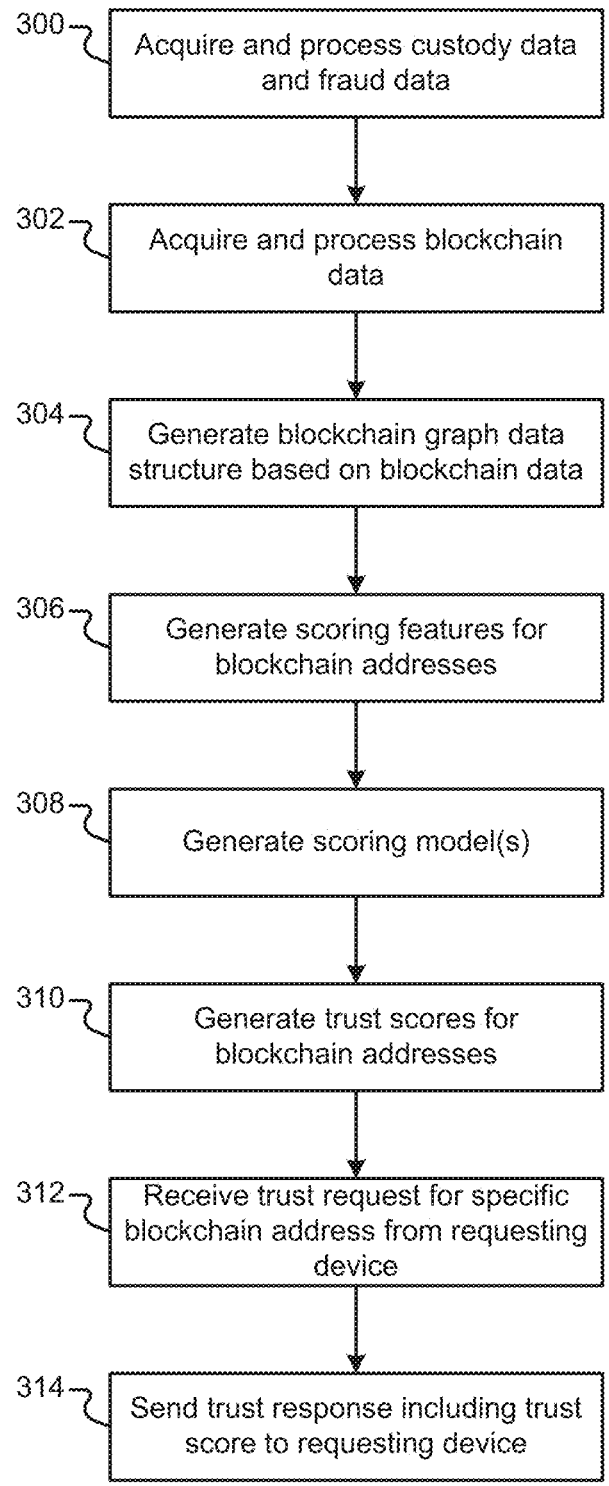
FIG. 3 is a method that describes operation of an example trust system.
Figure 4:
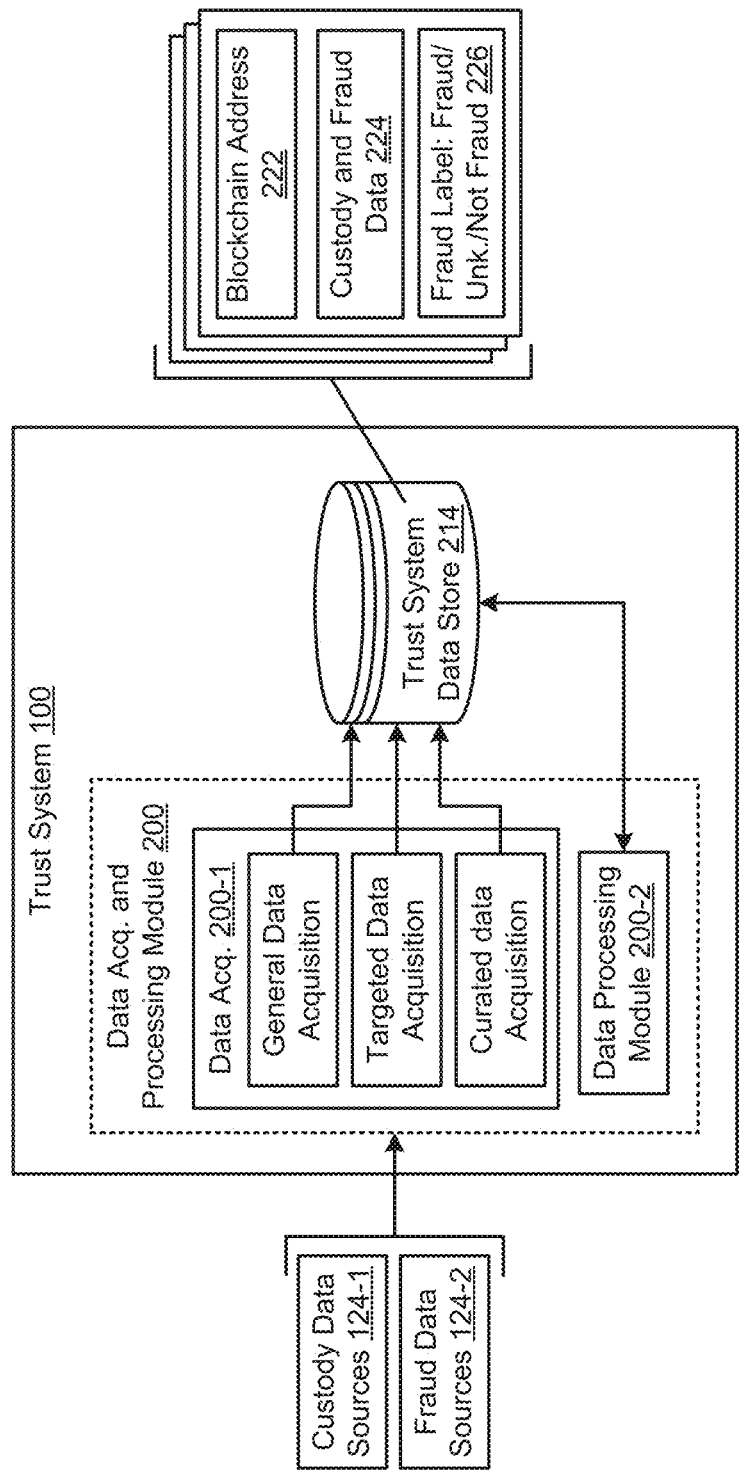
FIG. 4 is a functional block diagram of a data acquisition and processing module.
Figure 5:
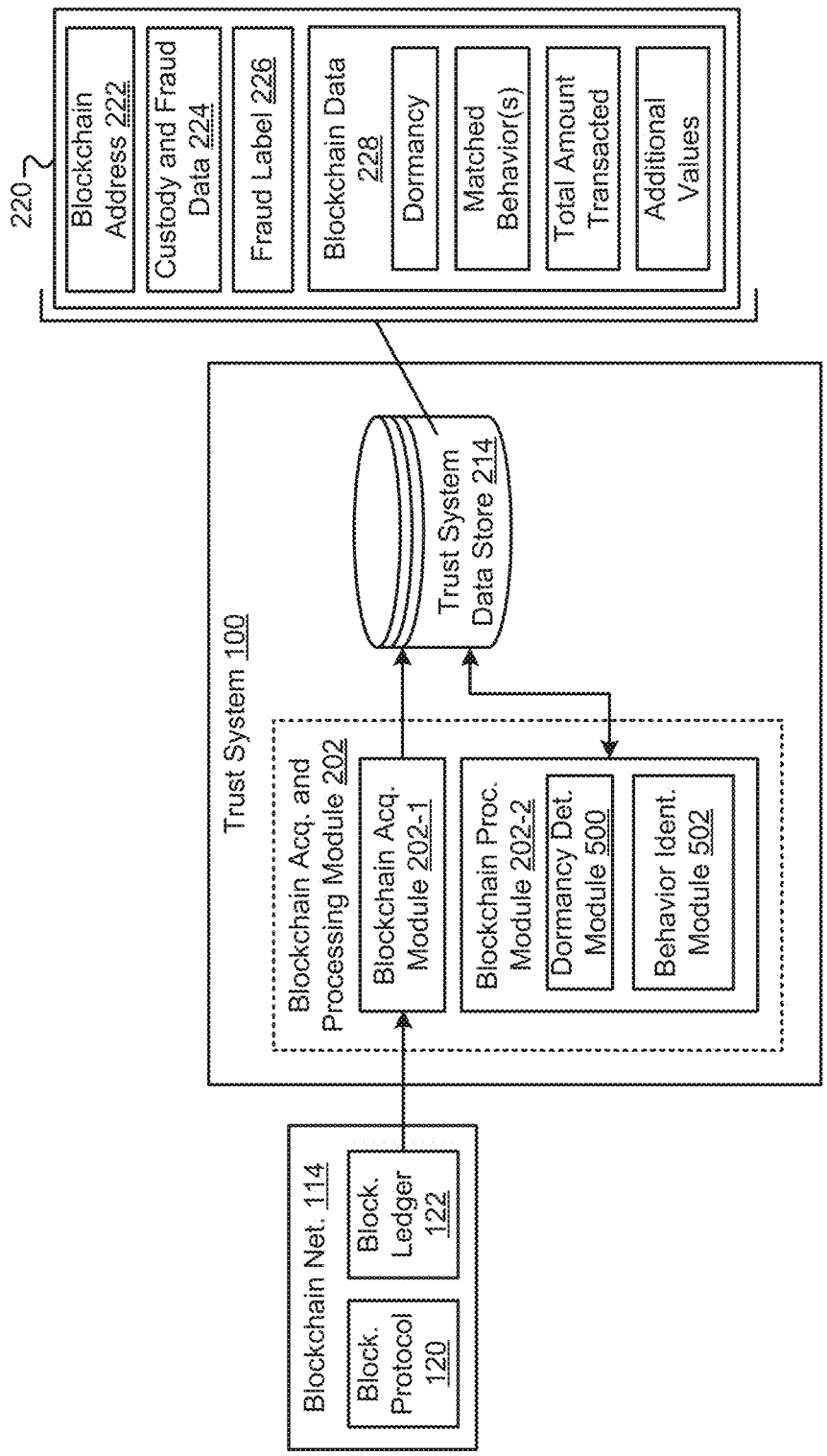
FIG. 5 is a functional block diagram of a blockchain data acquisition and processing module.
Figure 6A:
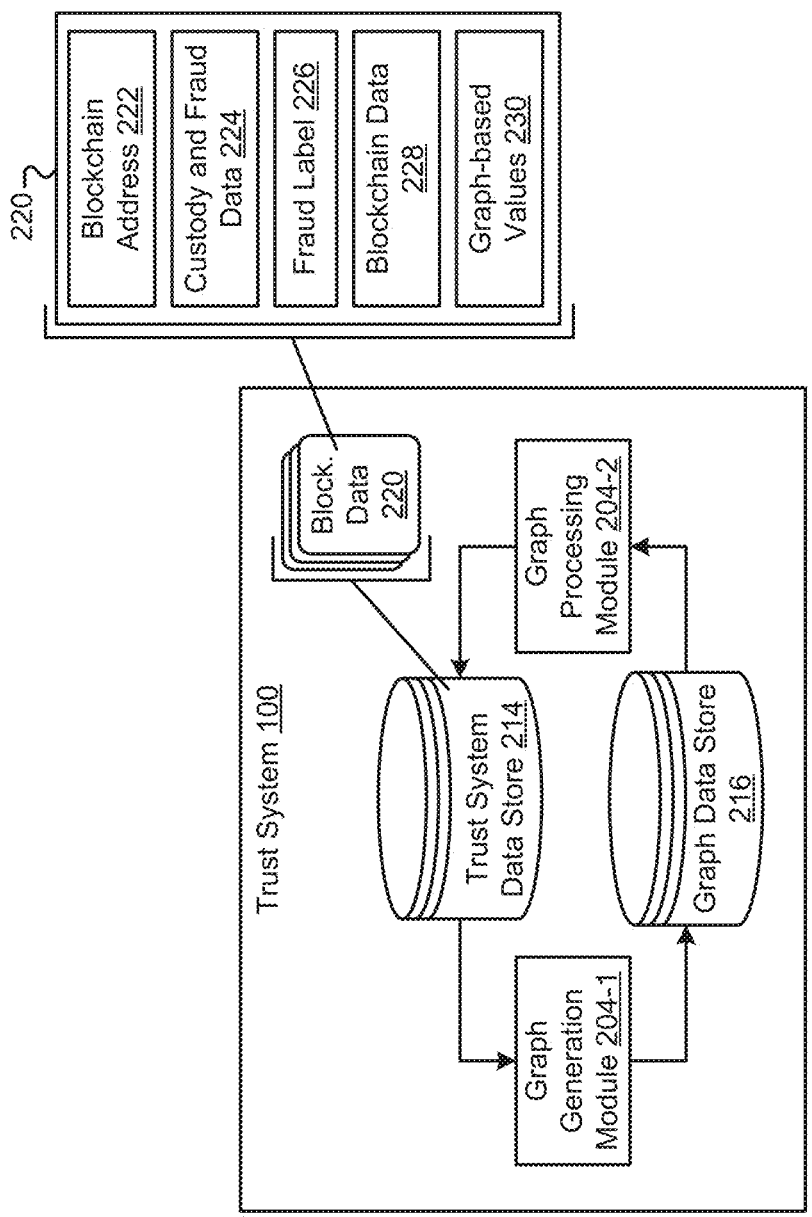
FIGS. 6A-6B illustrate generation and processing of a blockchain graph data structure.
Figure 6B:
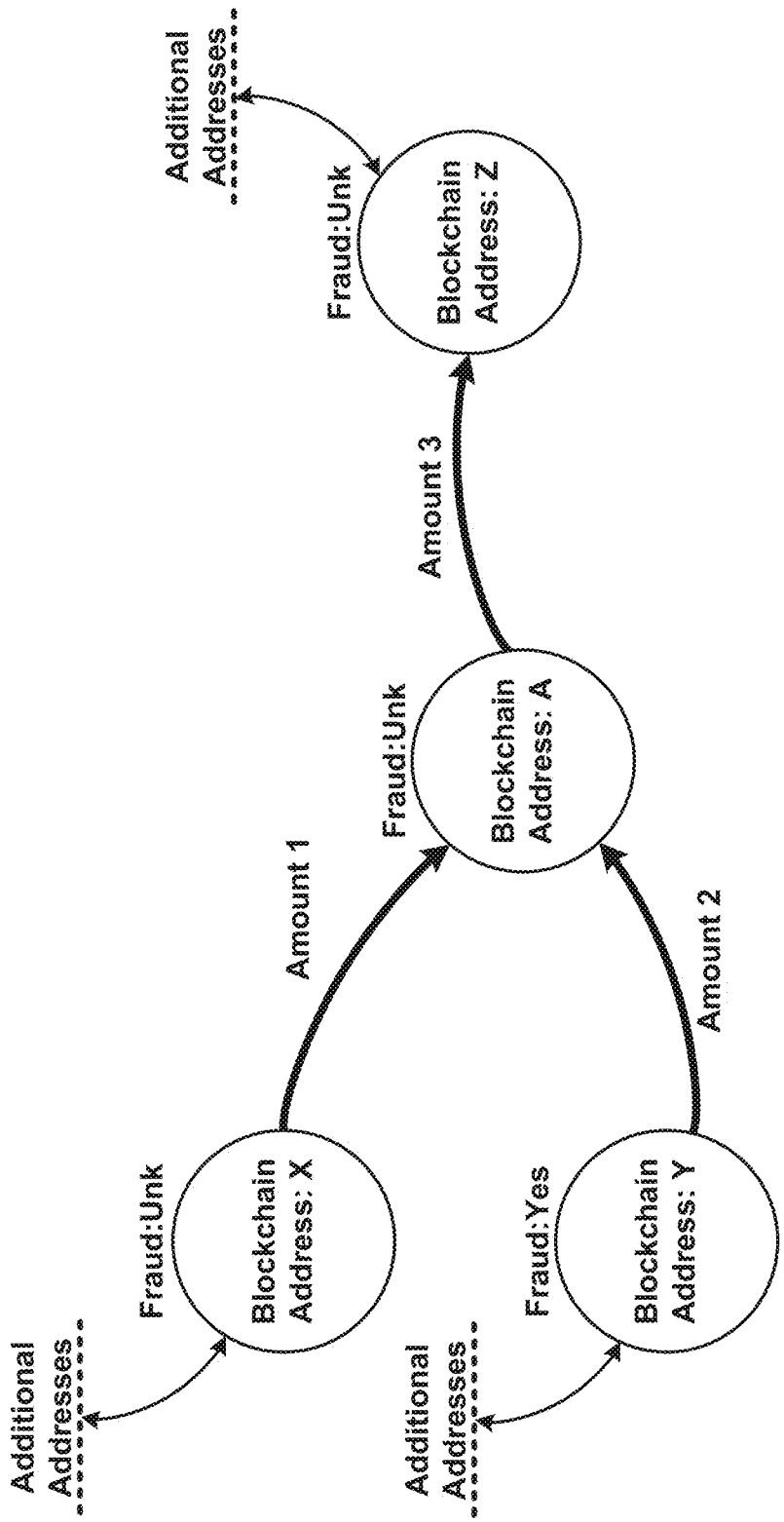
Figure 7:
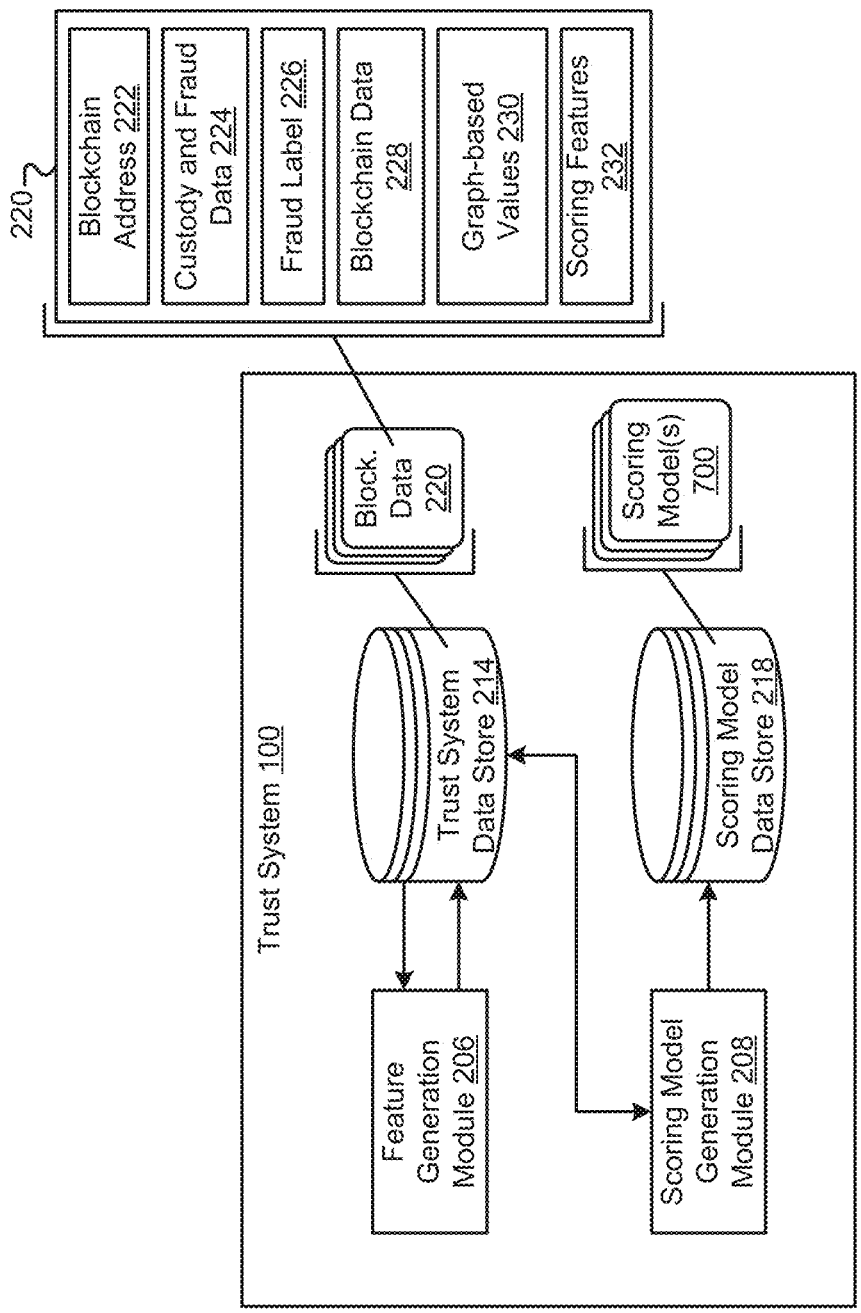
FIG. 7 is a functional block diagram of a scoring feature generation module and a scoring model generation module.
Figure 8:
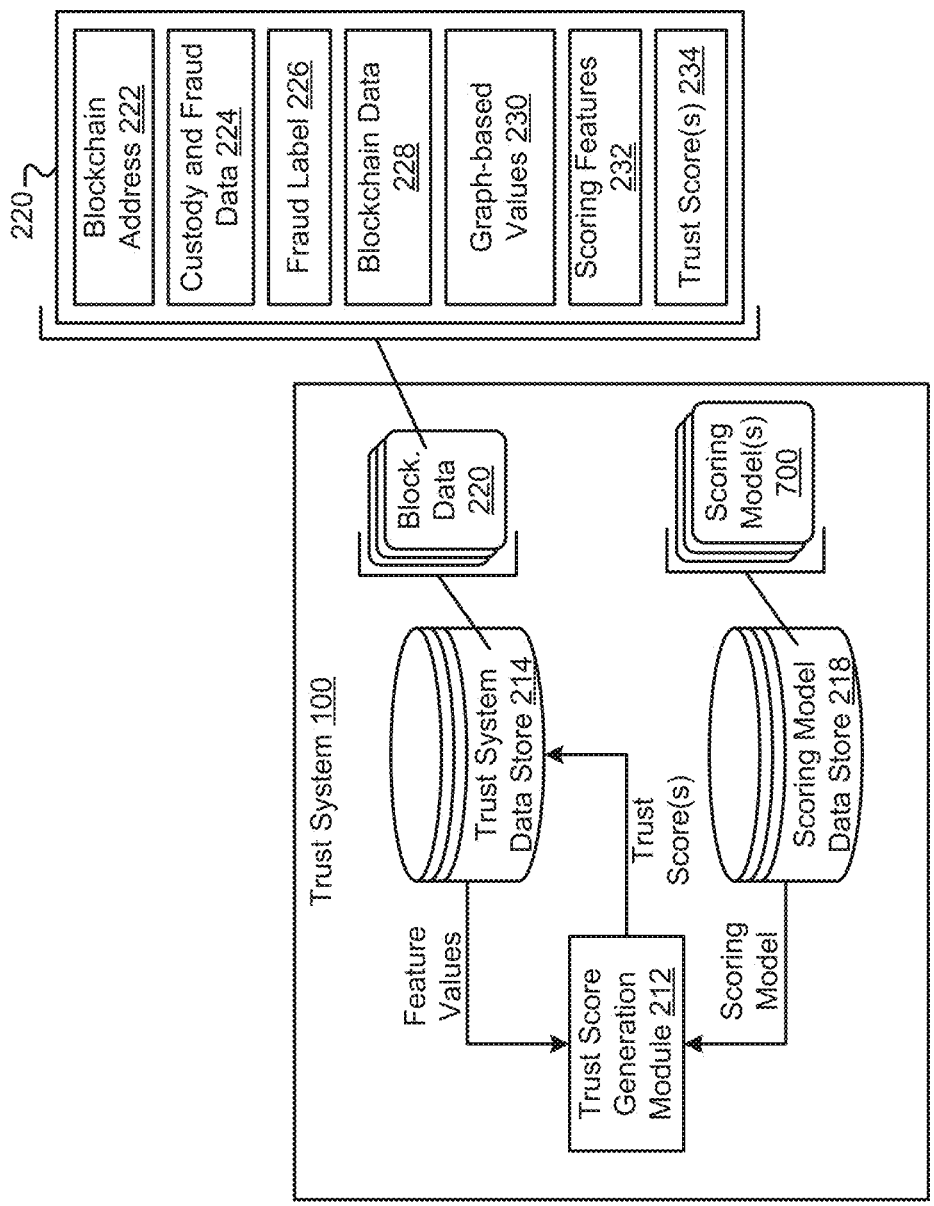
FIG. 8 is a functional block diagram that illustrates operation of a trust score generation module.
Figure 9:
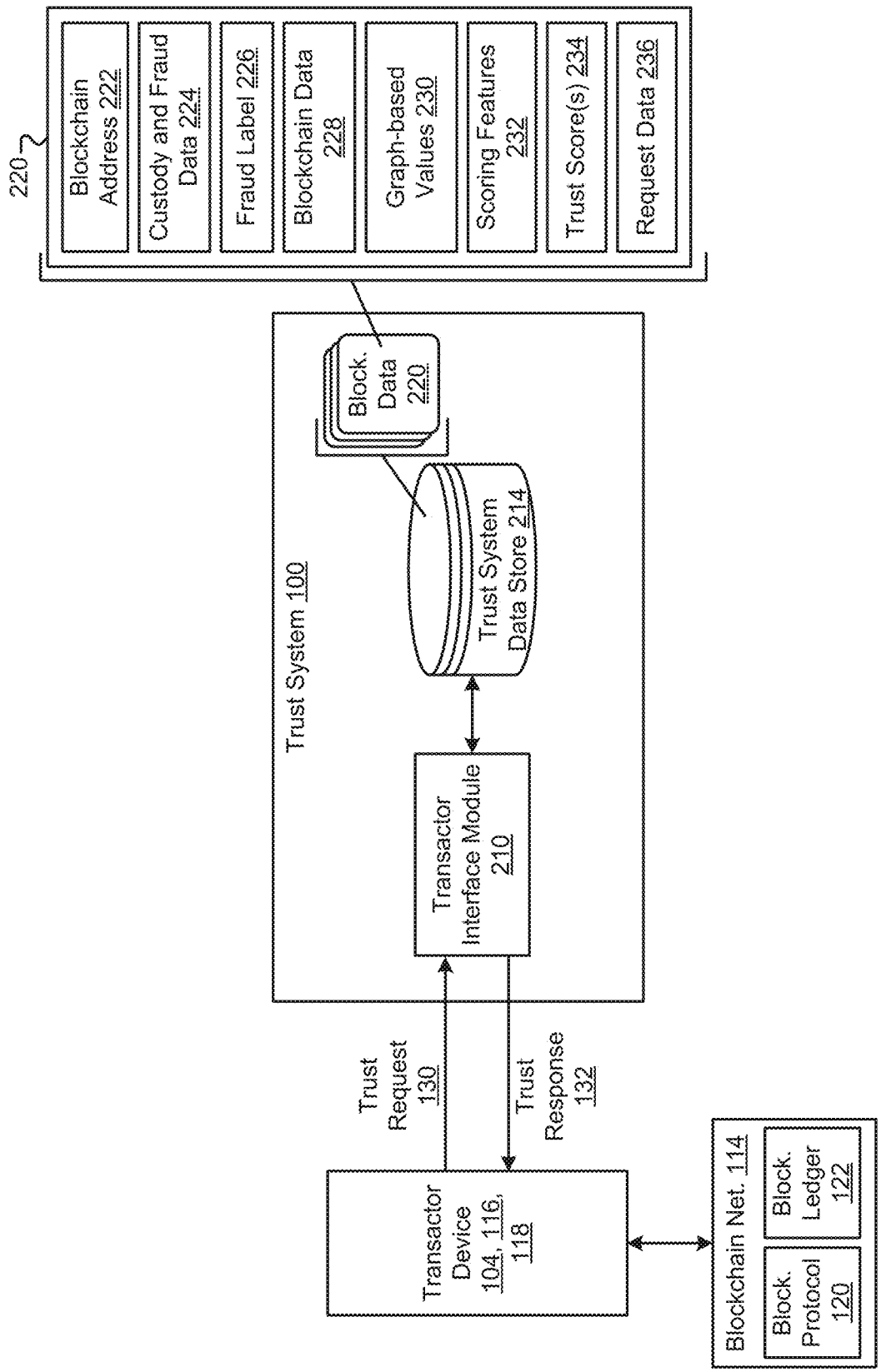
FIG. 9 is a functional block diagram of a transactor device in communication with the trust system.
Figure 10B:
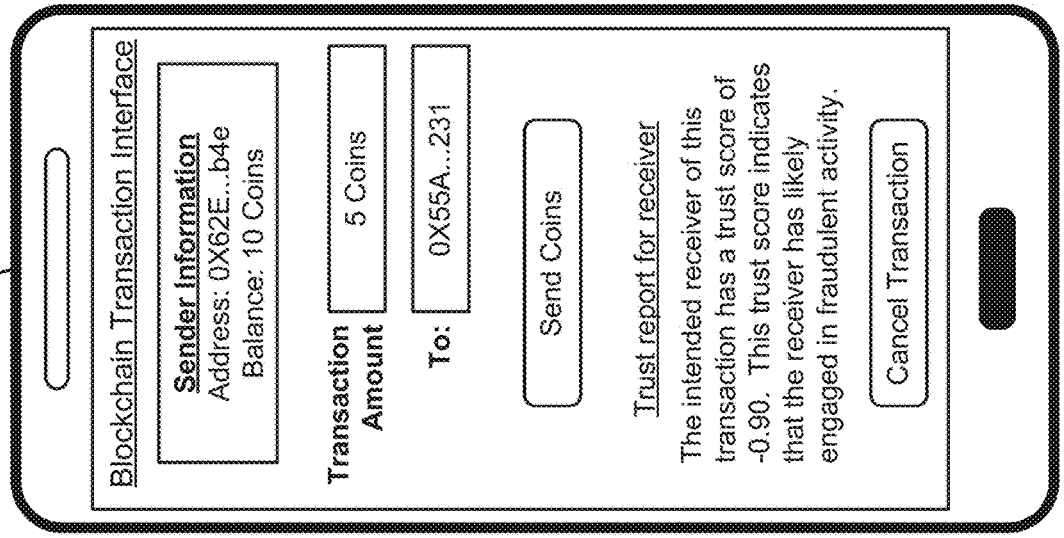
FIGS. 10A-10B illustrate graphical user interfaces (GUIs) for requesting and reviewing trust reports.
Figure 10A:
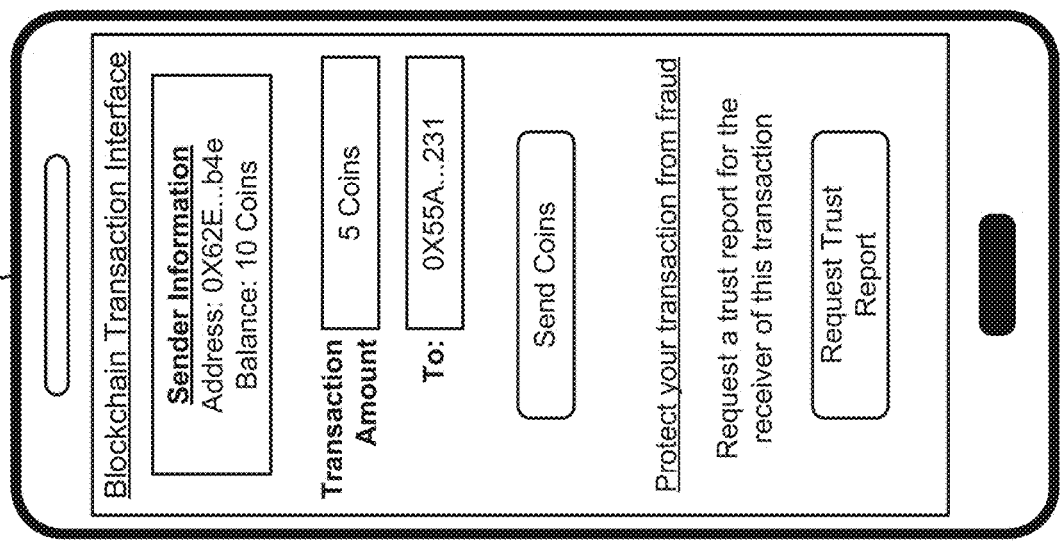
Figure 11:
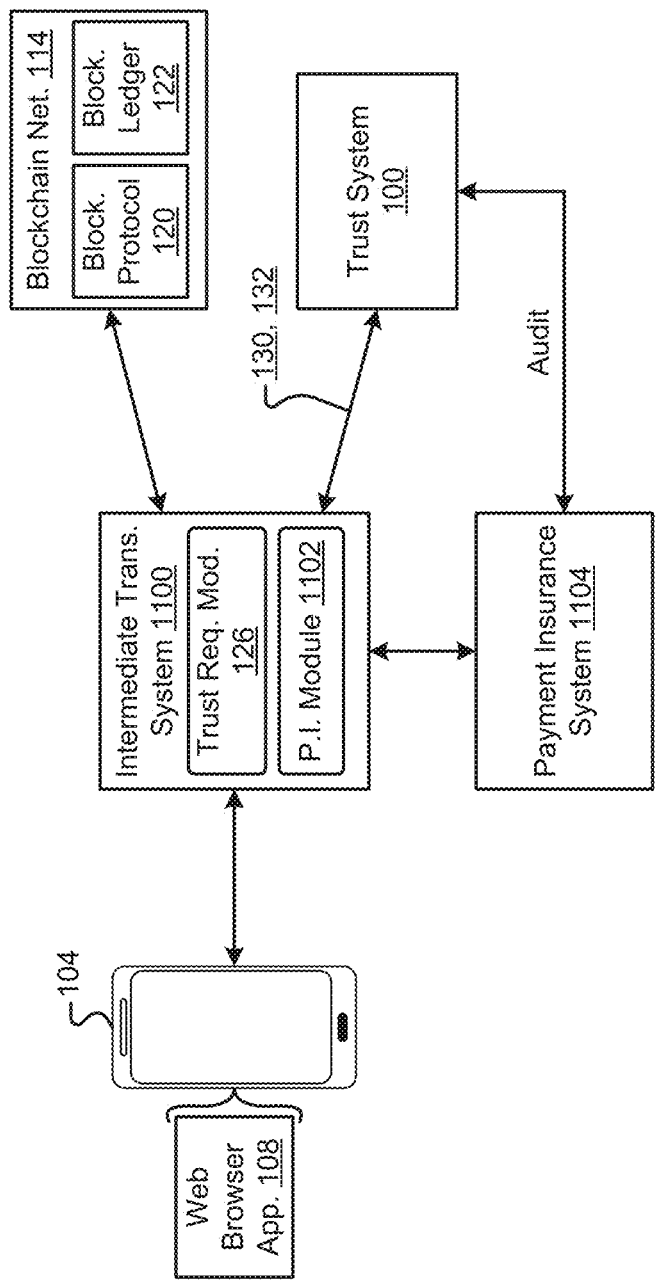
FIG. 11 is a functional block diagram of a trust system being used in a payment insurance implementation.

FIGS. 2-11 illustrate aspects of the trust system 100. FIG. 2 illustrates an example trust system 100. FIG. 3 is a method that describes operation of the trust system 100 illustrated in FIG. 2. FIG. 4 illustrates data acquisition and processing of fraud and custody data sources. FIG. 5 illustrates acquisition and processing of blockchain data. FIGS. 6A-6B illustrate generation and processing of a blockchain graph data structure. FIG. 7 illustrates scoring feature generation and scoring model generation. FIG. 8 illustrates the generation of trust scores for a blockchain address using a scoring model and scoring features for the blockchain address. FIGS. 9-10B illustrate aspects of a user transactor device communicating with the trust system. FIG. 11 illustrates the use of a trust system for a payment insurance application.

Referring to FIG. 2, the trust system 100 acquires and processes a variety of data described herein. The trust system 100 includes a trust system data store 214 that can store data for a plurality of blockchain addresses. The data associated with a single blockchain address is illustrated herein as a blockchain address record 220. The trust system data store 214 may include a plurality of such blockchain address records 220, each for a different blockchain address. Each blockchain address record 220 can include a blockchain address 222 that uniquely identifies the record. The blockchain address record 220 described herein represents data stored in the trust system 100. The trust system 100 may include a variety of different data structures that are used to implement the data. Accordingly, the blockchain address record 220 may be implemented using one or more different data structures than explicitly illustrated herein.

FIG. 3 is a method that describes operation of the trust system 100 illustrated in FIG. 2. In block 300, the data acquisition and processing module 200 acquires and processes a variety of types of data 124, such as custody data and fraud data (e.g., see FIG. 4). The data acquisition and processing module 200 may store custody and fraud data 224 related to a blockchain address in the blockchain address record 220. The data acquisition and processing module 200 may also generate a fraud label 226 that indicates whether the blockchain address is likely fraudulent based on the acquired fraud data.

In block 302, the blockchain acquisition and processing module 202 acquires and processes blockchain data (e.g., the blockchain ledger 122) (e.g., see FIG. 5). The blockchain acquisition and processing module 202 may store raw and processed blockchain data 228 relevant to a blockchain address in the blockchain address record 220. In block 304, the graph generation and processing module 204 generates a blockchain graph data structure based on the blockchain data (e.g., see FIGS. 6A-6B). The blockchain graph data structure may be stored in the graph data store 216. The graph generation and processing module 204 may also process the graph to determine one or more graph-based values 230 (e.g., importance values) that may be used to generate trust scores.

In block 306, the feature generation module 206 generates scoring features 232 for blockchain addresses (e.g., see FIG. 7). In block 308, the scoring model generation module 208 generates one or more scoring models based on the scoring features and other data (e.g., labeled fraud data). The one or more scoring models may be stored in the scoring model data store 218. In block 310, the trust score generation module 212 generates one or more trust scores 234 for blockchain addresses using one or more scoring models and the scoring features associated with the blockchain addresses (e.g., see FIG. 8).

In block 312, the transactor interface module 210 receives a trust request 130 for a blockchain address from a requesting device. In block 314, the transactor interface module 210 sends a trust response 132 including a trust score to the requesting device. The transactor interface module 210 may store data related to the requests and responses in the request data 236 of the blockchain address record 220.

Detailed examples of the various trust system modules and data stores are now described with respect to FIGS. 4-6A and FIGS. 7-9. FIGS. 4-6A and FIGS. 7-9 may illustrate subsets of the modules and data stores included in the trust system 100 (e.g., as illustrated in FIG. 2). Various modules and data stores have been omitted from FIGS. 4-6A and FIGS. 7-9 for illustration purposes only. For example, the various modules and data stores have been omitted to focus on the functionality associated with the modules and data stores that are illustrated in FIGS. 4-6A and FIGS. 7-9.

Referring to FIG. 4, the data acquisition and processing module 200 includes a data acquisition module 200-1 that acquires data from the fraud and custody data sources 124. The data acquisition and processing module 200 also includes a data processing module 200-2 that processes the acquired data. The raw and processed data 224 can be stored in the trust system data store 214. The data acquisition module 200-1 can acquire data in a variety of ways. In some implementations, the data acquisition module 200-1 can acquire curated data, such as curated data provided by partners/customers of the trust system 100. In some cases, the owner/operator of the trust system 100 may purchase curated data. In some cases, the operator of the trust system 100 can user peer-reviewed structured data.

In some implementations, the data acquisition module 200-1 may be configured to automatically acquire data (e.g., crawl/scrape websites). For example, the data acquisition module 200-1 may be configured to do targeted data acquisition, such as acquiring data for specific social media accounts. As another example, the data acquisition module 200-1 may perform more general data acquisition, such as more general crawling/scraping of sites.

The data acquisition module 200-1 can acquire custody data from custody data sources 124-1. Custody data may indicate the party that owns/controls the blockchain address (e.g., the keys). Example parties that may take custody of blockchain addresses may include, but are not limited to, exchanges, wallets, and banks. In some implementations, the custody sources 124-1 can provide the custody data to the trust system 100.

In some implementations, the trust system 100 may implement custodian specific trust score generation. For example, the trust system 100 may select a specific scoring model based on the custodian associated with the blockchain address. In some implementations, the trust system 100 may implement customer/custodian specific reporting for blockchain addresses (e.g., based on the custodian associated with the blockchain address). For example, the trust report may be formatted in a specific manner for a specific custodian.

The data acquisition module 200-1 acquires data that may provide evidence of fraud from a variety of fraud data sources 124-2. The trust system 100 may make a determination of the likelihood of fraud for blockchain addresses based on fraud data. For example, the trust system 100 may label blockchain addresses as fraud based on the fraud data. Subsequently, the trust system 100 may generate scoring features and scoring models based on the labeled blockchain addresses.

In some implementations, the trust system 100 may be configured to acquire databases and lists that indicate fraudulent activity associated with a blockchain address. In one example, fraud data sources 124-2 can include databases of fraud information, such as third-party databases of fraud information and/or customer provided databases of fraud information. The databases may be provided by public entities (e.g., government watchlists) and/or private entities (e.g., a company generated watchlist).

In some examples, a database of fraud information may be provided to the trust system 100 in the form of a blacklist that includes a list of blockchain addresses that have been identified as having engaged in fraud. In this example, the trust system 100 may acquire public blacklists, purchase blacklists, and/or receive blacklists from customers of the trust system 100. In some cases, blacklists may have been peer reviewed by a community of trusted parties (e.g., experts). In some implementations, the data processing module 200-2 can mark addresses as fraudulent if the address is included on a blacklist. In other implementations, the trust system 100 can use the presence of the blockchain address on a blacklist as a scoring feature for determining whether the blacklisted blockchain address is likely fraudulent.

In some implementations, the data acquisition module 200-1 may be configured to acquire fraud data from targeted locations, such as locations on the internet specified by web uniform resource locators (URLs) and/or usernames (e.g., a specific social media account). In some implementations, a customer of the trust system 100 may provide locations (e.g., web URLs) that the data acquisition module 200-1 may monitor for fraudulent activity. For example, a customer may provide a web address to a social media page associated with a specific blockchain address. In this example, the data processing module 200-2 may identify fraudulent behavior if a blockchain address other than the specified blockchain address appears in the web contents at the web address. In another example, if there is a known contribution address of an initial coin offering (ICO), accounts and blockchain addresses fraudulently attempting to acquire funds (e.g., phish) may be detected. The trust system 100 may then notify the customer of the fraudulent address and use the evidence of fraudulent activity as described herein.

Although the data acquisition module 200-1 may be configured to acquire fraud data from targeted locations, in some implementations, the data acquisition module 200-1 can generally crawl and scrape other data sources (e.g., social media sites) for fraud data and other data. In these examples, the data processing module 200-2 may identify fraudulent blockchain addresses based on behavior across a social media platform, such as scams that request funds from multiple social media users, new accounts that directly ask other users for funds, and fake initial coin offering scams.

In some implementations, the trust system 100 (e.g., the data processing module 200-2) may label a blockchain address as fraudulent (e.g., at 226). For example, the data processing module 200-2 may label a blockchain address as fraud based on fraud data. In a specific example, the data processing module 200-2 may label a blockchain address as fraud if the blockchain address is included in one or more blacklists. If a blockchain address is not labeled as fraud, the fraud status of the blockchain address may be unknown. Put another way, an unlabeled blockchain address does not necessarily indicate that the blockchain address is not fraudulent. In some cases, a blockchain address may be labeled as a known good address that is not fraudulent. For example, an exchange wallet or verified smart contract may be examples of known good addresses.

For blockchain addresses that are assigned one or more trust scores and labeled as fraud, the fraud label for the blockchain address may be dispositive on the issue of fraud for the blockchain address. As such, in these implementations, the trust system 100 may disregard the trust score for the blockchain address and/or set the trust score for the blockchain address to a 100% certainty of fraud. In other implementations, the trust system 100 may continue to calculate trust scores for the blockchain addresses labeled as fraud.

The fraud label 226 can also include fraud label metadata. The fraud label metadata may indicate the source of the information used to label the blockchain address as fraud (e.g., a specific blacklist). The fraud label metadata may also indicate a type of fraud (e.g., a phishing scam). The fraud label metadata can also include the content of the fraudulent behavior, such as text associated with a scam (e.g., text posted online or in an email). The trust system 100 can return the fraud label metadata to a requesting device to clearly explain the reason the trust system 100 has labeled a blockchain address as fraudulent.

Referring to FIG. 5, the blockchain data acquisition module 202-1 (hereinafter "blockchain acquisition module 202-1") can acquire blockchain data from the blockchain network 114. For example, the blockchain acquisition module 202-1 can acquire the blockchain transaction ledger 122. The blockchain acquisition module 202-1 can store the raw blockchain data 228 in the trust system data store 214. The blockchain processing module 202-2 can process the blockchain transaction ledger 122 and store the processed blockchain values 228 (e.g., transaction amounts, dormancy, etc.) in the trust system data store 214 (e.g., in a blockchain address record 220).

The blockchain transaction ledger 122 includes data for a plurality of blockchain transactions. Each transaction may include: 1) a sender address, 2) a receiver address, and 3) a value amount (e.g., a coin amount). A transaction may also include transaction identification data that uniquely identifies the transaction on the blockchain. The transaction identification data may be referred to herein as a transaction identifier (ID). In some implementations, a transaction hash can be used as a unique identifier for a transaction. A transaction hash may be a string of pseudorandom characters that uniquely identify a transaction. Some blockchains may also include additional data that the trust system 100 may store and process. Example additional data may include internal transaction data, such as a program that is executed in an Ethereum smart contract.

The blockchain transaction ledger can include a plurality of blocks. Each of the blocks can include a collection of transactions. A block may include a collection of transactions that occurred on the blockchain within a certain period of time. A block may include a block number (e.g., a sequentially assigned number) that may act as an identifier for the block. In the case of Bitcoin, a transaction may include the sending party's address, the receiving party's address, the amount sent, and various parameters describing speed. Ethereum may include similar transaction data, as well as raw data around what function on a smart contract was executed, if a function was executed.

Different blockchain networks may include different types of blockchain ledgers. For example, different blockchain ledgers may include blockchain transaction data in different formats. As another example, different blockchain ledgers may include additional or alternative data associated with transactions. The blockchain acquisition module 202-1 can be configured to acquire blockchain transaction data for different blockchains. For example, the blockchain acquisition module 202-1 can include different modules, each of which may be configured for acquiring blockchain transaction data for a different blockchain network.

In some cases, a blockchain network can include timing data that indicates the time of blockchain transactions (e.g., relative/absolute time). In these implementations, the blockchain acquisition module 202-1 can use the provided timing data to indicate when the transaction occurred. In other cases, a blockchain network may not include timing data. In these implementations, the blockchain acquisition module 202-1 can generate a time stamp for the transaction. In some cases, timing data can be generated from the block assigned to the transaction. Blocks may be assigned as part of the mining process whereby actors on the blockchain compete to verify the validity of a set of transactions. Once a block is mined, and the transactions are verified, then the timing data can be assumed from other miners' consensus.

The blockchain processing module 202-2 can determine a variety of values based on the acquired blockchain data. The trust system 100 (e.g., the trust score generation module 212) can use the determined values as scoring features for determining trust scores. The trust system 100 (e.g., the model generation module 208) can also generate scoring models based on the determined values. The blockchain values for a blockchain address can be stored in the blockchain address record (e.g., at 228).

The blockchain processing module 202-2 can include functionality for determining the different blockchain values described herein. For example, the blockchain processing module 202-2 of FIG. 5 includes a dormancy determination module 500 that can determine dormancy values for a blockchain address. The blockchain processing module 202-2 also includes a behavior identification module 502 that can determine whether the blockchain address matches one or more behavioral templates (e.g., patterns or fingerprints). The modules 500, 502 included in the blockchain processing module 202-2 of FIG. 5 are only example modules. As such, the blockchain processing module 202-2 may include additional/alternative modules than those modules illustrated in FIG. 5. Additionally, the blockchain values included in the blockchain data 228 of FIG. 5 are only example values. As such, the blockchain data for a blockchain address may include additional/alternative values.

In some implementations, the blockchain processing module 202-2 may determine values associated with the amount of funds transacted by a blockchain address. For example, the blockchain processing module 202-2 may determine: 1) a total amount of funds received by the blockchain address, 2) a total amount of funds sent by the blockchain address, 3) the total amount of funds transacted in and out of the blockchain address, and 4) the average transaction amount for the blockchain address.

In some implementations, the blockchain processing module 202-2 may determine values associated with the timing of transactions associated with a blockchain address. For example, the blockchain processing module 202-2 can determine an activity level of the blockchain address, such as how often the address is involved in a transaction (e.g., average times between transactions and variance). As another example, the blockchain processing module 202-2 can determine the age of transactions associated with the address. Another example scoring feature related to timing may include the time between entrance of funds and exit of funds from a blockchain address (e.g., timing for a single transaction or average over multiple transactions). In some cases, fraudulent activity may not immediately exit an address.

As another example, the dormancy determination module 500 can determine the probability of dormancy for the blockchain address. An example dormancy probability may indicate an amount of time for which the blockchain address is not associated with transactions. For example, a dormancy probability may indicate an amount of time for which the blockchain address is not associated with transactions relative to the address' expected time between transactions. Put another way, the example dormancy time may indicate the probability that the blockchain address is dormant. With respect to dormancy likelihood, fraudulent addresses may not stay active for long in some cases.

In some implementations, the blockchain processing module 202-2 may determine values associated with the timing of transactions and the amount of the transactions. For example, the blockchain processing module 202-2 may determine: 1) a total amount of funds received over a period of time, 2) a total amount of funds transferred over a period of time, and 3) a total amount of funds transacted over a period of time.

In some implementations, the blockchain processing module 202-2 may determine values associated with how the blockchain address interacts with other blockchain addresses. For example, the blockchain processing module 202-2 may determine the list of addresses that have interacted with the blockchain address and/or the total number of addresses that have interacted with the blockchain address (e.g., as senders and/or receivers). This value may be iteratively computed to determine how important an address is to its local neighborhood and the blockchain as a whole.

The blockchain processing module 202-1 includes a behavior identification module 502 that can determine whether a blockchain address matches specific behavior templates that may be indicative of fraud. If the behavior identification module 502 identifies a match between a blockchain address' behavior and a behavior template, the match may be stored in the blockchain address record 220. In some implementations, the trust system 100 may store a set of behavior templates. In these implementations, the behavior identification module 502 can determine whether the blockchain address' behavior matches one or more of the set of behavior templates.

A behavior template may include a set of conditions that, if satisfied, cause the behavior template to be matched to the blockchain address. A behavior template may include conditions that are based on any of the blockchain values described herein. For example, a behavior template may include conditions that are based on at least one of 1) amounts of funds transferred, 2) the number of transactions, 3) the timing of transactions (e.g., rate of transactions), 4) how the blockchain address interacts with other addresses (e.g., number of different senders/receivers and patterns of transactions), and 5) the likelihood of dormancy of the address.

In one specific example, a behavior template may define a threshold number of transactions (e.g., 5 transactions in and out) at a threshold rate. In this example, the behavior template may be matched if a blockchain address engages in a low number of transactions (e.g., less than or equal to the threshold number) in quick succession (e.g., a short rapid burst). Another example condition for the behavior template may be a high dormancy probability, as any transactions may be limited to bursts. In another specific example, a behavior template may define a high threshold number of transactions (e.g., irregularly high for the blockchain). In this example, a behavior template may be matched if the blockchain address engages in greater than the threshold number of transactions. In this example, the behavior template may also require a high importance value, such that the blockchain address is required to have a minimum importance value to match the template. Furthermore, the behavior template may require a low likelihood of dormancy, as the fraudulent behavior may follow a pattern of regular transactions.

If the blockchain address matches a behavior template, the match may be stored as a blockchain value in the blockchain address record 220. For example, the blockchain address record may store a binary value (e.g., 0/1) for each behavior template that indicates whether the behavior template was matched. In implementations where the behavior identification module 502 determines a value (e.g., a decimal or integer value) that indicates how well the blockchain address matches the behavior template, the value may be stored in the blockchain address record 220.

Referring to FIGS. 6A-6B, the graph generation module 204-1 generates a blockchain graph data structure based on the blockchain transactions for a plurality of different blockchain addresses. The graph data structure includes blockchain addresses and transactions between the blockchain addresses. For example, for each blockchain address, the graph data structure may describe each transaction associated with the blockchain address along with the direction of the transaction, such as whether the blockchain address was a sender or receiver. The graph data structure can also include the transaction amount for each transaction. In some implementations, the graph data structure can include fraud data (e.g., fraud labels). The fraud label can indicate that the address has been involved in fraudulent activity (e.g., a known fraudulent address).

FIG. 6B illustrates an example representation of the graph data structure. In FIG. 6B, the graph data structure is represented by nodes and edges. The graph data structure includes blockchain addresses as nodes of the graph. The transactions between blockchain addresses are edges between the nodes, where the arrows indicate the direction of the transaction (e.g., the receiver is at the arrowhead). The amount for each transaction is labeled adjacent to the arrow. The fraud label for each blockchain address is included above the node. FIG. 6B includes 4 transactors with blockchain addresses A, X, Y, Z. Blockchain address Y has been labeled as a fraudulent address. The other blockchain addresses have an unknown fraud status. The graph illustrates 3 blockchain transactions. A first transaction is from blockchain address X to blockchain address A for a first amount (i.e., amount 1). A second transaction is from blockchain address Y to blockchain address A for a second amount (i.e., amount 2). A third transaction is from blockchain address A to blockchain address Z for a third amount (i.e., amount 3).

The graph data structure is stored in the graph data store 216. The graph generation module 204-1 can update the graph data structure over time so that the graph data structure includes an up to date representation of the transactions included on the blockchain network 114.

The graph processing module 204-2 can generate graph-based values 230 using the graph data structure. The graph-based values 230 may be stored in the blockchain address record 220. The graph processing module 204-2 can update the graph-based values 230 over time.

In some implementations, the graph processing module 204-2 can determine one or more importance values for each of the blockchain addresses. The importance values may indicate the importance of a blockchain address relative to other blockchain addresses (e.g., relative to all blockchain addresses). In some implementations, the graph processing module 204-2 may determine the importance values for a blockchain address based on adjacent blockchain addresses. In some implementations, the graph processing module 204-2 may weight the contribution of adjacent blockchain addresses by the importance of the blockchain addresses.

In some implementations, the graph processing module 204-2 may determine an importance value by counting the number of transactions coming into a blockchain address. In this specific example, more transactions may indicate that the blockchain address is more important than other blockchain addresses with fewer incoming transactions. In some implementations, the graph processing module 204-2 may determine an importance value by determining the number of different blockchain addresses with which the blockchain interacts. In some implementations, the graph processing module 204-2 may determine an importance value that indicates the total amount of funds into the blockchain address relative to the amount of funds out of the address (e.g., amount out divided by amount in). In another example, the graph processing module 204-2 may determine an importance value that indicates the number of transactions into the blockchain address relative to the number of transactions out of the blockchain address (e.g., total number of transactions in divided by total number of transactions out). In another example, the graph processing module 204-2 may determine an importance value based on the number of transactions in to the blockchain address, the number of transactions out of the blockchain address, the amount of funds in, and the amount of funds out. In some implementations, the graph processing module 204-2 may implement other processing techniques, such as PageRank (PR) and/or personalized hitting time (PHT).

In some implementations, the graph processing module 204-2 may determine a fraud distance scoring feature that indicates the blockchain address' distance from fraud in the graph. For example, fraud distance scoring features may include a minimum distance from fraud, an average distance from fraud, and/or the number of fraudulent blockchain addresses with which the blockchain address has interacted.

Referring to FIG. 7, the feature generation module 206 can generate scoring features for each of the blockchain addresses. The trust system 100 (e.g., trust score generation module 212) can generate one or more trust scores for a blockchain address based on the scoring features associated with the blockchain address. The scoring features can be numerical values (e.g., integer or decimal values), Boolean values (e.g., 0/1), enumerated values, or other values.

The feature generation module 206 can generate the scoring features based on any of the blockchain values described herein. For example, scoring features for a blockchain address may be based on 1) amounts associated with transactions, 2) timing data associated with transactions (e.g., dormancy), 3) graph-based values (e.g., one or more importance values) associated with the blockchain address, and/or 4) behavior-based data associated with the blockchain address.

With respect to behavior-based data, the feature generation module 206 may generate a Boolean scoring feature that indicates whether the blockchain address matches any of the behavior templates. In another example, the feature generation module 206 may generate a Boolean scoring feature for each of the behavior templates, such that the scoring features identify which of the behavior templates are matched. In another example, the feature generation module 206 may generate a scoring feature that indicates how many of the behavior templates were matched (e.g., a percentage of the total available). In another example, instead of generating Boolean features, the feature generation module 206 may generate numeric values that indicate how well the blockchain address matched the behavior templates, such as a decimal value (e.g., 0.00-1.00) that indicates how well the behavior template was matched.

The trust system 100 includes a scoring model generation module 208 (referred to herein as a "model generation module 208") that can generate scoring models 700 that are used to generate trust scores for a blockchain address. For example (e.g., see FIG. 8), a scoring model can receive scoring features for a blockchain address and output a trust score for the blockchain address. The model generation module 208 can generate a scoring model based on training data. The training data can include scoring features along with associated fraud labels. The set of scoring features a model uses as input may be referred to herein as a "feature vector." In some implementations, the trust system 100 can use a deep neural net to score, where the classification is determined by known good/bad addresses. The neural net may be trained over the feature vectors. In some implementations, the trust system 100 can leverage models based on random forests, decision trees, and logistic regression, and combine them in the form of a "consensus of experts."

The model generation module 208 can generate a scoring model (e.g., a machine learned model) based on training data that includes sets of feature vectors and their corresponding fraud label (e.g., Fraud: 0/1). In this example, the generated scoring model may output a trust score (e.g., a decimal value) that indicates the likelihood the blockchain address is fraudulent. In some implementations, the training data may also include a label that positively indicates that the blockchain address is a known good address (e.g., not fraudulent).

Although the trust system 100 can generate scoring models that are used to generate trust scores, the trust system may generate trust scores in other manners. For example, the trust system may generate trust scores using scoring functions (e.g., weighted scoring functions) and/or heuristic models that generate trust scores according to rules.

FIG. 8 illustrates an example trust score generation module 212 that generates trust scores for blockchain addresses. The trust score generation module 212 may generate a trust score for a blockchain address by using a feature vector for the blockchain address and a scoring model. For example, the trust score generation module 212 may input a feature vector for a blockchain address into a scoring model that outputs a trust score.

The trust score 234 for a blockchain address can be stored in the blockchain address record 220. The trust score generation module 212 can generate trust scores for each of the blockchain addresses. The trust score generation module 212 can also update the trust scores over time, such as when additional data is acquired at the trust system 100. A blockchain address record 220 can include the most recently calculated trust score, as well as historically calculated trust scores. In some implementations, the trust system 100 can leverage the change in trust score (and historical score) to provide a real-time alerting system, such that a party can be notified if the trust score of an address drops (e.g., as in the case of an organization receiving fraudulent funds through an address they control). The trust system 100 may provide an API that can hook into their service that can freeze the transaction and alert the relevant people at that organization (e.g., by phone, email, etc.).

The trust score generation module 212 may be configured to provide the trust score in a variety of formats. In some implementations, the trust score may be an integer value with a minimum and maximum value. For example, the trust score may range from 1-7, where a trust score of '1' indicates that the blockchain address is likely fraudulent. In this example, a trust score of '7' may indicate that the blockchain address is not likely fraudulent (i.e., very trustworthy). In some implementations, the trust score may be a decimal value. For example, the trust score may be a decimal value that indicates a likelihood of fraud (e.g., a percentage value from 0-100%). In some implementations, a trust score may range from a maximum negative value to a maximum positive value (e.g., −1.00 to 1.00), where a larger negative value indicates that the address is more likely fraudulent. In this example, a larger positive value may indicate that the address is more likely trustworthy. The customer may select the trust score format they prefer.

FIG. 9 illustrates interaction between the trust system 100 and a transactor device 104, 116, 118 (e.g., a user device or server). In FIG. 9, the transactor interface module 210 receives a trust request 130 for a blockchain address. The transactor interface module 210 may retrieve the trust score for the indicated blockchain address. The transactor interface module 210 sends the retrieved trust score to the transactor device 104, 116, 118 in the trust response 132. Although the transactor interface module 210 can retrieve a pre-generated trust score, in some cases, the trust system 100 may generate a trust score in real time in response to the trust request 130 if the trust score is not yet calculated and/or is outdated.

The transactor interface module 210 may provide an interface for transactor devices/systems 104, 116, 118. For example, the transactor interface module 210 may provide a API for interacting with the trust system 100. In some implementations, the transactor interface module 210 can generate interfaces for user transactor devices 104, such as a GUI (e.g., a web-based interface). In other cases, the transactor application 112 and/or an intermediate transaction system 116 can generate a GUI for displaying data retrieved from the trust system 100.

In some implementations, the transactor interface module 210 can store request data 236 for each trust request 130. The request data 236 may include any data associated with a received trust request 130 and/or the provided trust response 132. The request data 236 may be stored in the associated blockchain address record 220.

In some implementations, a blockchain address record may store request data 236 each time a trust request 130 is made for the blockchain address. In these implementations, the request data 236 may indicate a number of times a trust request was made for the blockchain address. The request data 236 may also indicate the blockchain address that made the trust request, the trust score that was reported to the requestor, and the time of the request. Accordingly, the request data 236 may show trends over time regarding the parties that are requesting trust scores for a blockchain address.

In some implementations, the scoring features for a blockchain address may include scoring features that are based on the request data 236. One example scoring feature may be a total number of times a trust request was made for the blockchain address. Another example scoring feature may be a number of different blockchain addresses that made trust requests for the blockchain address. Other example features may include the frequency at which trust requests were made for the blockchain address (e.g., a number of requests over a time period).

FIGS. 10A-10B illustrate example GUIs that may be generated on a user transactor device 104 by the transaction application 112 or the intermediate transaction system 116. The illustrated GUIs may be for a sender in a blockchain transaction. It can be assumed that the blockchain network on which the blockchain transactions occur in FIGS. 10A-10B use units of "coins" for transactions. The top portion of the GUIs includes fields that indicate the sender's information, such as the sender's blockchain address and their balance (e.g., 10 coins). The top portion of the GUIs also include fields in which the sender can specify a receiver address and indicate the transaction amount (e.g., 5 coins) for the potential transaction. The GUIs include a "Send Coins" GUI element that can initiate the specified transaction between the sender and the receiver.

The lower portion of the GUIs in FIGS. 10A-10B provide the sender with the option of acquiring a trust report from the trust system 100 before engaging in the transaction. For example, in FIG. 10A, the user can select (e.g., touch/click) the "Request Trust Report" GUI element to send a trust request to the trust system. The trust request may include the receiver's address, as specified in the "To:" box above. FIG. 10B illustrates an example trust report received in response to the trust request.

In FIG. 10B, the received trust report indicates that the receiver had a trust score of −0.90. It can be assumed in this case that a negative valued trust score near −1.0 indicates that the receiver address is likely fraudulent. Similarly, a positive valued trust score near 1.0 may indicate that the receiver address is not fraudulent. In addition to the numeric score of −0.90, the trust report also summarizes the meaning of the trust score number. Specifically, the trust report indicates that the "trust score indicates that the receiver has likely engaged in fraudulent activity." The GUI also provides a "Cancel Transaction" GUI element that the sender may select (e.g., touch/click) to cancel the specified transaction.

FIG. 11 illustrates an example in which the trust system 100 is queried as part of a payment insurance process. In FIG. 11, the user transactor device 104 transacts on the blockchain network 114 via an intermediate transaction system 1100. The intermediate transaction system 1100 includes a trust request module 126 that can retrieve trust reports from the trust system 100. The intermediate transaction system 1100 may also provide payment insurance to the transactor.

The intermediate transaction system 1100 of FIG. 11 includes a payment insurance module 1102 that may determine whether a transaction will be insured. The terms on which transactions are insurable may be agreed to by the owner/operator of the intermediate transaction system 1100 and the owner/operator of the payment insurance system 1104 (e.g., an underwriter system). In some implementations, payment insurance may be provided for transactions in which the transacting blockchain addresses have trust scores that indicate a low likelihood of fraud. The payment insurance system 1104 can acquire data related to the transactions (e.g., trust scores, timing, etc.) for auditing purposes.

In FIG. 11, initially, the transactor device 104 may initiate a transaction with the intermediate transaction system 1100. In response to the initiated transaction, the intermediate transaction system 1100 (e.g., the trust request module 126) may retrieve a trust report for the receiver and/or the sender. The intermediate transaction system 1100 may then determine whether the transaction is insurable. For example, the payment insurance module 1102 may determine whether the transacting blockchain addresses have trust scores that indicate a low likelihood of fraud. In some implementations, the payment insurance module 1102 may compare trust scores to trust score threshold values that indicate a maximum tolerable likelihood for fraud. In these implementations, the payment insurance module 1102 may indicate that the transaction is insurable if the trust score(s) are less than the trust score threshold value. If the trust score(s) are greater than the tolerable level for fraud, payment insurance may be declined.

In some implementations, the payment insurance module 1102 may query the payment insurance system 1104 to determine whether the transaction is insurable. The query may indicate the trust scores for the transacting parties. In these implementations, the payment insurance system 1104 can make the determination of whether to insure the transaction. The payment insurance system 1104 may then notify the intermediate transaction system 1100 of whether the transaction is insurable.

In addition to the trust system 100 playing a part in payment insurance processes, the trust system 100 may also play a role in other financial processes. For example, the trust scores/reports generated by the trust system 100 may be used in order to freeze transactions and/or clawback funds.

Although the trust system 100 may calculate a single trust score for each of the blockchain addresses, regardless of whether the blockchain address is a sender or receiver, in some implementations, the trust system 100 may calculate a receiver trust score and a sender trust score for each address. In one example, a blockchain address which regularly falls prey to scams can have the sender trust score set as less trustworthy than a blockchain address which does not often fall prey to scams. In another example, a blockchain address which regularly falls prey to phishing scams may not have a modified receiver trust score when there is no indication of nefarious activity associated with receiving funds at the blockchain address.

Modules and data stores included in the trust system 100 represent features that may be included in the trust system 100 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provide communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the trust system 100 may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the trust system 100 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the trust system 100 may be configured to communicate with the network 102 of FIG. 1A. The one or more computing devices of the trust system 100 may also be configured to communicate with one another (e.g., via a computer network). In some examples, the one or more computing devices of the trust system 100 may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the trust system 100 may be distributed across a number of geographic locations.

What is claimed is:

1. A method comprising:
acquiring, at a server, blockchain data from a blockchain network, wherein the blockchain data includes a plurality of transactions between a plurality of blockchain addresses;
labeling, at the server, a set of the blockchain addresses as fraudulent;
generating, at the server, a graph data structure based on the blockchain data, wherein the graph data structure includes nodes for the blockchain addresses and includes edges between the nodes for blockchain transactions;
calculating, at the server, a set of scoring features for each blockchain address, wherein each set of scoring features includes a graph-based scoring feature, and wherein calculating the graph-based scoring feature includes calculating a number of transactions associated with the blockchain address in the graph data structure;
generating, at the server, a scoring model using sets of scoring features for the blockchain addresses that are labeled as fraudulent;
generating, at the server, a trust score for each of the blockchain addresses using the scoring features associated with the blockchain addresses and the scoring model, wherein the trust score indicates a likelihood that the blockchain address is involved in fraudulent activity;
receiving, at the server, a trust request for a specified blockchain address from a requesting device; and
sending, from the server, the trust score for the specified blockchain address to the requesting device.

2. The method of claim 1, wherein calculating the graph-based scoring feature comprises calculating a number of transactions in which the blockchain address is a receiver address and calculating a number of transactions in which the blockchain address is a sender address.

3. The method of claim 1, wherein calculating the graph-based scoring feature comprises calculating an amount of funds transacted with the blockchain address.

4. The method of claim 1, wherein calculating the graph-based scoring feature comprises calculating an amount of funds received by the blockchain address and calculating an amount of funds sent by the blockchain address.

5. The method of claim 1, wherein the graph-based scoring feature is a first graph-based scoring feature, wherein the set of scoring features includes a second graph-based scoring feature, and wherein calculating the second graph-based scoring feature comprises calculating a distance between the blockchain address node and a plurality of other nodes labeled as fraud in the graph data structure.

6. The method of claim 1, wherein the set of scoring features includes a transaction rate scoring feature, and wherein calculating the transaction rate scoring feature comprises calculating a rate at which the blockchain address transacts with other blockchain addresses.

7. The method of claim 1, wherein the set of scoring features includes a transaction amount scoring feature, and wherein calculating the transaction amount scoring feature comprises calculating an amount of funds transacted by the blockchain address within a period of time.

8. The method of claim 1, wherein the set of scoring features includes a timing scoring feature, and wherein calculating the timing scoring feature comprises calculating a time between entrance of funds into the blockchain address and exit of the funds from the blockchain address.

9. The method of claim 1, wherein the set of scoring features includes a dormancy scoring feature, and wherein calculating the dormancy scoring feature comprises calculating an amount of time for which the blockchain address does not participate in transactions.

10. The method of claim 9, wherein calculating the dormancy scoring feature comprises calculating an amount of time for which the blockchain address does not participate in transactions relative to an expected amount of time between transactions for the blockchain address.

11. The method of claim 1, wherein the set of scoring features includes a request data scoring feature, and wherein calculating the request data scoring feature comprises calculating a number of times a trust score was requested for the blockchain address.

12. The method of claim 1, wherein the set of scoring features includes a behavior feature that indicates whether the behavior of the blockchain address satisfies conditions specified in a behavior template.

13. The method of claim 12, wherein the behavior template includes conditions that specify a number of transactions and a rate of transactions.

14. The method of claim 1, wherein the set of scoring features includes a first behavior feature that indicates whether a behavior of the blockchain address satisfies a first set of conditions specified in a first behavior template, and wherein the set of scoring features includes a second behavior feature that indicates whether the behavior of the blockchain address satisfies a second set of conditions specified in a second behavior template.

15. The method of claim 1, further comprising:
acquiring a list of fraudulent blockchain addresses; and
labeling the set of the blockchain addresses as fraudulent based on the acquired list.

16. A system comprising:
one or more processing units that execute computer-readable instructions that cause the one or more processing units to:
acquire blockchain data from a blockchain network, wherein the blockchain data includes a plurality of transactions between a plurality of blockchain addresses;
label a set of the blockchain addresses as fraudulent;
generate a graph data structure based on the blockchain data, wherein the graph data structure includes nodes for the blockchain addresses and includes edges between the nodes for blockchain transactions;
calculate a set of scoring features for each blockchain address, wherein each set of scoring features includes a graph-based scoring feature, and wherein calculating the graph-based scoring feature includes calculating a number of transactions associated with the blockchain address in the graph data structure;
generate a scoring model using sets of scoring features for the blockchain addresses that are labeled as fraudulent;
generate a trust score for each of the blockchain addresses using the scoring features associated with the blockchain addresses and the scoring model, wherein the trust score indicates a likelihood that the blockchain address is involved in fraudulent activity;
receive a trust request for a specified blockchain address from a requesting device; and send the trust score for the specified blockchain address to the requesting device.

17. The system of claim 16, wherein calculating the graph-based scoring feature comprises calculating a number of transactions in which the blockchain address is a receiver address and calculating a number of transactions in which the blockchain address is a sender address.

18. The system of claim 16, wherein calculating the graph-based scoring feature comprises calculating an amount of funds transacted with the blockchain address.

19. The system of claim 16, wherein calculating the graph-based scoring feature comprises calculating an amount of funds received by the blockchain address and calculating an amount of funds sent by the blockchain address.

20. The system of claim 16, wherein the graph-based scoring feature is a first graph-based scoring feature, wherein the set of scoring features includes a second graph-based scoring feature, and wherein calculating the second graph-based scoring feature comprises calculating a distance between the blockchain address node and a plurality of other nodes labeled as fraud in the graph data structure.

21. The system of claim 16, wherein the set of scoring features includes a transaction rate scoring feature, and wherein calculating the transaction rate scoring feature comprises calculating a rate at which the blockchain address transacts with other blockchain addresses.

22. The system of claim 16, wherein the set of scoring features includes a transaction amount scoring feature, and wherein calculating the transaction amount scoring feature comprises calculating an amount of funds transacted by the blockchain address within a period of time.

23. The system of claim 16, wherein the set of scoring features includes a timing scoring feature, and wherein calculating the timing scoring feature comprises calculating a time between entrance of funds into the blockchain address and exit of the funds from the blockchain address.

24. The system of claim 16, wherein the set of scoring features includes a dormancy scoring feature, and wherein calculating the dormancy scoring feature comprises calculating an amount of time for which the blockchain address does not participate in transactions.

25. The system of claim 24, wherein calculating the dormancy scoring feature comprises calculating an amount of time for which the blockchain address does not participate in transactions relative to an expected amount of time between transactions for the blockchain address.

26. The system of claim 16, wherein the set of scoring features includes a request data scoring feature, and wherein calculating the request data scoring feature comprises calculating a number of times a trust score was requested for the blockchain address.

27. The system of claim 16, wherein the set of scoring features includes a behavior feature that indicates whether the behavior of the blockchain address satisfies conditions specified in a behavior template.

28. The system of claim 27, wherein the behavior template includes conditions that specify a number of transactions and a rate of transactions.

29. The system of claim 16, wherein the set of scoring features includes a first behavior feature that indicates whether a behavior of the blockchain address satisfies a first set of conditions specified in a first behavior template, and wherein the set of scoring features includes a second behavior feature that indicates whether the behavior of the blockchain address satisfies a second set of conditions specified in a second behavior template.

30. The system of claim 16, wherein the one or more processing units are configured to:
   acquire a list of fraudulent blockchain addresses; and
   label the set of the blockchain addresses as fraudulent based on the acquired list.

* * * * *